C. J. COLEMAN.
POULTRY PRODUCING APPARATUS.
APPLICATION FILED OCT. 26, 1909.
1,158,447. Patented Nov. 2, 1915.
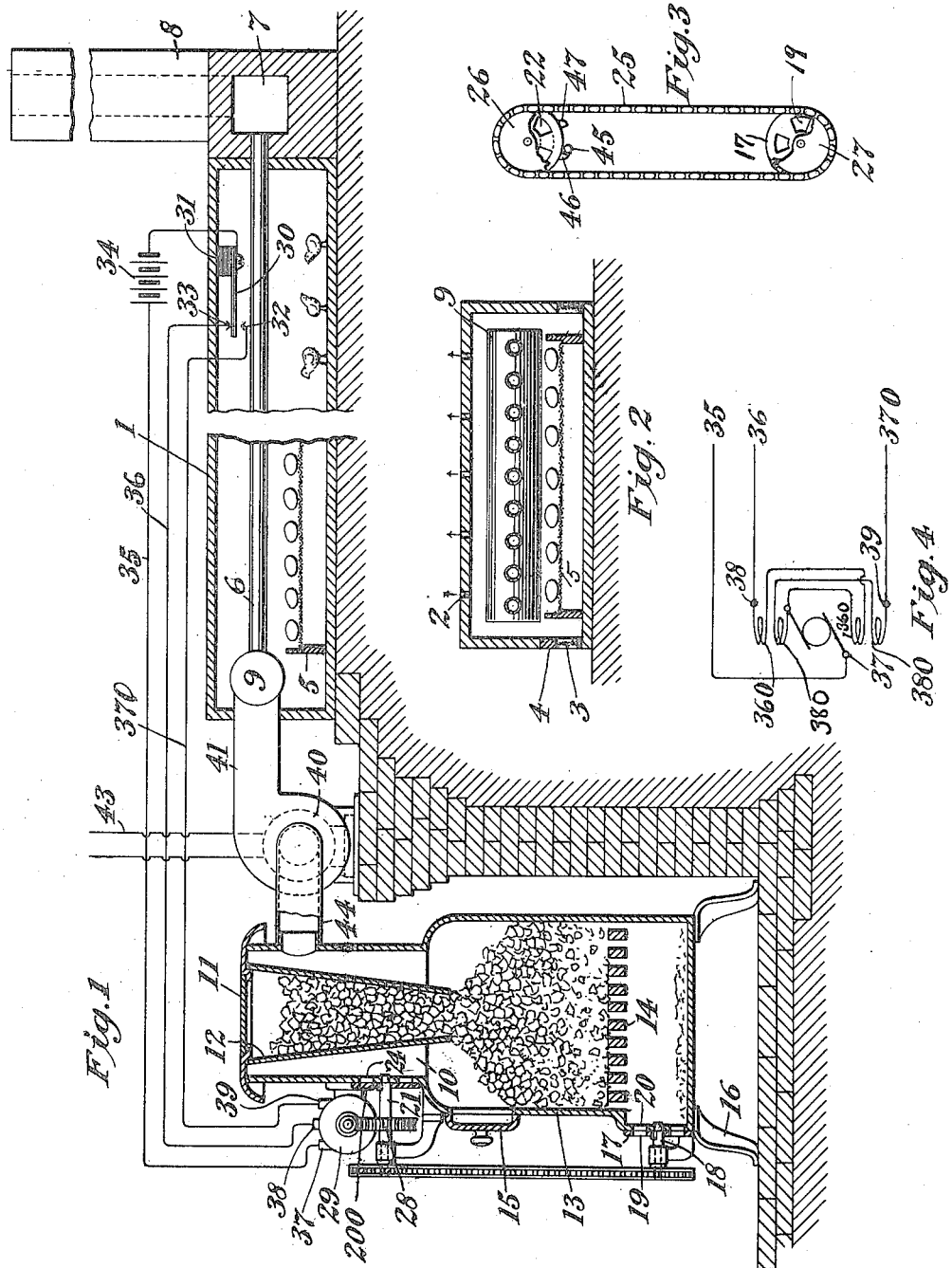

UNITED STATES PATENT OFFICE.

CLYDE J. COLEMAN, OF NEW YORK, N. Y.

POULTRY-PRODUCING APPARATUS.

1,158,447.      Specification of Letters Patent.      Patented Nov. 2, 1915.

Application filed October 26, 1909. Serial No. 524,635.

*To all whom it may concern:*

Be it known that I, CLYDE J. COLEMAN, a citizen of the United States, residing at No. 203 West One Hundred and Seventeenth street, in the city, county, and State of New York, have invented a new and useful Improvement in Poultry-Producing Apparatus, of which the following is a specification.

My invention relates to a poultry producing apparatus, and more particularly to one in which a compartment is provided to receive the products such as eggs, chicks, or young fowl which are to be heated and which compartment must be kept at a substantially uniform temperature.

One of the objects of my invention is to provide a poultry producing apparatus having a compartment adapted to receive the products to be heated, with a heating pipe or pipes supplying heat to the compartment and discharging the gases contained in the heating pipe outside of said compartment, at the same time combining therewith a combustion chamber having an air intake for supplying the air for combustion and an auxiliary air intake for supplying cooling air which is mixed with the products of combustion, said mixture being conveyed through said heating pipes.

Another object of my invention is to provide an apparatus of the class described having a compartment to be heated, heating pipes therefor, a combustion chamber provided with an air intake, an auxiliary air intake for supplying cooling air, with means for forcing the mixture of cooling air and products of combustion through the heating pipes.

Another object of my invention is to automatically control the proportion of cooling air and products of combustion supplied to the heating pipes used to heat a compartment in a poultry producing apparatus.

Another object of my invention is to combine a thermostat and a motor controlled thereby with dampers located in the air intake for supplying the air for combustion and the air intake for supplying cooling air so as to automatically control the proportion of cooling air and products of combustion which pass through the heating pipes.

With the above and other objects in view, my invention consists in the parts, improvements and combinations more fully pointed out hereinafter.

Referring now to the drawings which are attached to this specification and form a part thereof, Figure 1 is a longitudinal vertical section of the apparatus showing the compartment to be heated, the combustion apparatus and the thermostatic control for the heating devices. Fig. 2 is a transverse section through the compartment to be heated. Fig. 3 is a detail view showing the mechanical connection between the dampers which control the air supplies. Fig. 4 is a diagrammatic view of the motor and controlling circuits.

In accordance with my invention I provide a simple and inexpensive heating system for heating the compartment 1 which is adapted to receive the products to be heated. In the form of the invention illustrated, the compartment 1 is designed to heat either eggs, in which case it acts as an incubator, or young fowl, in which case it acts as a brooder. It may be used interchangeably for these purposes, or as will be readily understood, its use may be confined to either purpose. The top of the compartment is provided with perforations 2 and the sides are screened by screens 3. A door 4 permits access to the compartment. The eggs to be heated rest on a removable and reticulated egg tray 5.

Suitable means are provided for supplying heat to the compartment. As illustrated, heating pipes 6 are arranged within the compartment and discharge the gases contained therein outside of said compartment into the base 7 of the chimney 8. The heating pipes are preferably connected at one end to a drum 9.

Suitable means are provided for heating the gases which enter the heating pipe. In one embodiment of the invention, I make use of a stove or furnace having a combustion chamber 10 for this purpose. The stove has the usual lid 11, fuel chute 12, casing 13, grate 14, door 15, and legs 16.

I provide suitable means for supplying heating air, and particularly air for combustion and for regulating said air supply. In the form of the invention illustrated, a rotary damper 17 is provided which is carried by the shaft 18 and which has holes 19 which register with openings 20 in the bottom of the side of the stove or furnace. As the damper 17 turns, the amount of air passing through the holes 19, 20 varies, as will be readily understood.

Suitable means are provided for supplying cooling air which is mixed with the products of combustion. In the form of the invention illustrated, I provide a damper 200 for this purpose. The damper is preferably mounted upon a shaft 21 and is provided with holes 22 (see Fig. 3) which register with corresponding holes 24 in one side of the combustion chamber.

Suitable means are provided for automatically controlling the proportion of cooling air and air for combustion so as to maintain a substantially uniform temperature in the compartment 1. As illustrated, I connect the damper 200 with the damper 17, preferably by a mechanical connection, such as the chain 25, which surrounds sprocket wheels 26 and 27 secured respectively to the shafts 21 and 18 on which the dampers are mounted. The shaft 21 also carries a worm wheel 28 which is geared to the motor 29 that drives the shaft. The electric motor 29, in the particular embodiment of the invention illustrated, is controlled by a three wire circuit in which is included a thermostat 30. The thermostat 30 consists of two pieces of metal secured together and mounted on an insulating block 31, the two metals having different temperature co-efficients. Normally, the thermostat 30 rests between the contacts 32 and 33, in which case the normal temperature of the compartment prevails. When the thermostat 30 is in contact with the upper contact 33 the battery 34 sends a current through the wires 35 and 36 to the terminals 37 and 38 of the motor, thus turning the motor in one direction so as to increase the amount of air supplied for combustion, and so as to diminish the amount of air supplied for cooling the mixture. When the thermostat 30 rests in contact with the lower contact 32, the circuit through the wires 35 and 370 which is completed by means of the terminals 37 and 39 and battery 34 turns the motor 29 in the opposite direction which diminishes the amount of air supplied for combustion and increases the amount of air for cooling the mixture. The temperature of the compartment 1 will, therefore, increase or diminish accordingly. The motor 29 is constructed with two sets of field coils. One set 360 when supplied with current causes the motor to turn in one direction, and the other set 380 causes the motor to turn in the opposite direction. The current passes through the fields 360 in one direction and through the fields 380 in the opposite direction to accomplish this result.

Suitable means are provided for forcing the mixture of cooling air and products of combustion through the heating pipes. In the particular embodiment of the invention illustrated, a blower 40 contained in a casing 41 and rotated by a motor, such as an electric motor is used for this purpose. The motor is supplied with current from wires 43 leading to a suitable source of energy. A pipe 44 connects the blower with the combustion chamber 10.

Means are provided for limiting the movement of the dampers, and in the particular embodiment of the invention illustrated, a stop 45 attached to the frame of the apparatus is used which contacts with projections 46 and 47 on the damper 200. When the motor has turned the damper to the full extent in either direction, the stop prevents further movement and the motor comes to rest, the weak battery current being insufficient to drive the motor farther.

Having thus described the construction of the apparatus, its operation will be apparent. If the temperature in the compartment 1 should fall, the thermostat 30 closes the proper circuit which actuates the motor which operates the regulating valves so as to restore the temperature to the normal amount.

If the temperature rises, the motor is driven in the opposite direction, which supplies less heat to the heating pipes resulting in a restoration of a normal temperature. The temperature of the compartment is thus kept substantially uniform.

Having thus described my invention and one particular mode of its application, it will be obvious that many changes may be made in the particular construction employed to carry the invention into effect without sacrificing the principle thereof or its chief advantages.

Having thus described my invention, what I claim as new and desire to secure by Letters Patent is:

1. In a poultry producing apparatus, the combination of an incubator or brooder compartment adapted to receive the eggs or chicks to be heated, a heating pipe supplying heat to said compartment, a combustion chamber provided with an air intake for supplying the air for combustion, means for controlling said air supply, means including an auxiliary air intake arranged to supply cooling air to said combustion chamber to mix with the products of combustion, and means for controlling the supply of cooling air simultaneously with the means for controlling the air for combustion, said mixture being conveyed to said heating pipe and said pipe being arranged to discharge said mixture outside of said compartment.

2. In a poultry producing apparatus, the combination of an incubator or brooder compartment adapted to receive the egss or chicks to be heated, a heating pipe supplying heat to said compartment, a combustion chamber provided with an air intake for supplying the air for combustion, means for controlling the said air supply, means including an auxiliary air intake for supplying cooling air to be mixed with the products of combustion, means for controlling the supply of cooling air, connections between the means for controlling the supply of air for combustion and the means for controlling the supply of cooling air, and means for forcing said mixture through said heating pipe, said pipe being arranged to discharge said mixture outside of said compartment.

3. In a poultry-producing apparatus, the combination of a compartment adapted to receive the chicks or eggs to be heated, a heating pipe supplying heat to said compartment, a stove provided with a casing and an air intake for supplying the air for combustion, means including an auxiliary air intake for admitting cooling air to said casing to mix with the products of combustion, means other than the draft of the combustion apparatus for causing a substantially constant quantity of mixture to flow through said heating pipe, and means for automatically controlling the proportion of cooling air and products of combustion so as to maintain a substantially uniform temperature in said compartment, said pipe being arranged to discharge said mixture outside of said compartment.

4. In a poultry-producing apparatus, the combination of a compartment adapted to receive the chicks or eggs to be heated, a heating pipe supplying heat to said compartment, a stove provided with a casing and an air intake for supplying the air for combustion, means including an auxiliary air intake for admitting cooling air to said casing to mix with the products of combustion, means for forcing the flow of said mixture through said heating pipe, said pipe being arranged to discharge said mixture outside of said compartment, a thermostat for said compartment, a motor controlled by said thermostat, and a damper for the cooling air actuated by said motor.

5. In a poultry-producing apparatus, the combination of a compartment adapted to receive the chicks or eggs to be heated, a heating pipe supplying heat to said compartment, a combustion chamber provided with an air intake for supplying the air for combustion, means including an auxiliary air intake for supplying cooling air to the combustion chamber to mix with the products of combustion, means for forcing the flow of said mixture through said heating pipe, said pipe being arranged to discharge said mixture outside of said compartment, a thermostat for said compartment, a motor controlled by said thermostat, and a damper for the air supplied to the combustion chamber, actuated by said motor.

6. In a poultry-producing apparatus, the combination of a compartment adapted to receive the chicks or eggs to be heated, a heating pipe supplying heat to said compartment, a stove provided with a casing and an air intake for supplying the air for combustion, means including an auxiliary air intake for admitting cooling air to said casing to mix with the products of combustion, means for forcing the flow of said mixture through said heating pipe, said pipe being arranged to discharge said mixture outside of said compartment, a thermostat for said compartment, a motor controlled by said thermostat, a damper for the air supplied to the combustion chamber, a damper for the cooling air, and means whereby said dampers are coördinately controlled by said motor.

7. In a poultry-producing apparatus, the combination of a compartment adapted to receive the chicks or eggs to be heated, a heating pipe supplying heat to said compartment, a stove provided with a casing and with an air intake for supplying the air for combustion, means including an auxiliary air intake for admitting cooling air to said casing to mix with the products of combustion, said mixture being conveyed through said heating pipe, said pipe being arranged to discharge said mixture outside of said compartment, a thermostat for said compartment, a motor controlled by said thermostat, a rotary damper for the air supplied to the combustion chamber, a rotary damper for the cooling air, means connecting said dampers, said dampers being actuated by said motor, and a stop to limit the movement of said dampers.

8. In a poultry producing apparatus, the combination of a compartment adapted to receive the eggs or chicks to be heated, a plurality of heating pipes extending side by side through said compartment and above its floor, the space between the pipes and the floor being adapted to receive the eggs or chicks to be heated, said compartment also being provided with ventilating openings, a combustion chamber provided with an air intake for supplying the air for combustion, means including an auxiliary air intake for admitting cooling air to be mixed with the products of combustion, means for forcing the flow of said mixture through said heating pipes said pipes being arranged to discharge said mixture outside of said compartment, a thermostat for said compartment and a damper for the cooling air controlled by said thermostat.

9. In a poultry producing apparatus, the combination of a compartment adapted to receive the eggs or chicks to be heated, a plurality of heating pipes, extending side by side through said compartment above its floor, the space between the pipes and the floor, being adapted to receive the eggs or chicks to be heated, said compartment also being provided with ventilating openings, a combustion chamber provided with an air intake for supplying air for combustion, means including an auxiliary air intake for admitting cooling air to be mixed with the products of combustion, the controlling means for said air intakes for supplying air for combustion and the controlling means for said auxiliary air intakes for cooling air, being connected so as to vary the respective supplies simultaneously and means for discharging said mixture through said heating pipes outside of said compartment.

10. In a poultry producing apparatus, the combination of a compartment adapted to receive the eggs or chicks to be heated, a heating pipe supplying heat to said compartment, a stove provided with a casing and an air intake for supplying the air for combustion, means including an auxiliary air intake for admitting cooling air to said casing to be mixed with the products of combustion, said mixture being conveyed through said heating pipe and discharged by said pipe outside of said compartment, and means for simultaneously controlling the proportion of cooling air and products of combustion so as to maintain the temperature of said compartment.

In testimony whereof, I have signed my name to this specification, in the presence of two subscribing witnesses.

CLYDE J. COLEMAN.

Witnesses:
W. C. MARGESON,
D. HAROLD BUSH.